United States Patent
Haugen

(10) Patent No.: US 6,450,875 B1
(45) Date of Patent: Sep. 17, 2002

(54) MONITORING AIR ENTRY VELOCITY INTO FUME HOOD

(75) Inventor: Robert Haugen, Statesville, NC (US)

(73) Assignee: Kewaunee Scientific Corporation, Statesville, NC (US)

( * ) Notice: Subject to any disclaimer, the term of this patent is extended or adjusted under 35 U.S.C. 154(b) by 0 days.

(21) Appl. No.: 09/650,212

(22) Filed: Aug. 29, 2000

(51) Int. Cl.[7] .............................................. B08B 15/02
(52) U.S. Cl. ...................... 454/56; 454/58; 73/861.61
(58) Field of Search ........................... 454/49, 56, 57; 73/861.61, 861.64, 861.66

(56) References Cited

U.S. PATENT DOCUMENTS

| | | | | |
|---|---|---|---|---|
| 1,630,317 A | * | 5/1927 | Skonier | 454/56 |
| 4,160,407 A | * | 7/1979 | Duym | 454/49 |
| 4,309,897 A | | 1/1982 | Springer et al. | |
| 4,344,330 A | * | 8/1982 | Renken et al. | 73/861.66 |
| 4,548,128 A | * | 10/1985 | Morikawa et al. | 454/56 |
| 4,660,525 A | | 4/1987 | Mesman | |
| 4,741,257 A | | 5/1988 | Wiggin et al. | |
| 4,957,007 A | | 9/1990 | Gray | |
| 5,135,684 A | | 8/1992 | Mohn et al. | |
| 5,306,207 A | * | 4/1994 | Courts | 454/49 |
| 5,312,297 A | * | 5/1994 | Dieckert et al. | 454/238 |
| 5,415,583 A | * | 5/1995 | Brandt, Jr. | 454/61 |
| 5,563,338 A | * | 10/1996 | Leturmy et al. | 73/64.49 |
| 5,697,838 A | | 12/1997 | Morris | |
| 5,797,790 A | * | 8/1998 | Rindoks et al. | 454/62 |
| 6,109,116 A | * | 8/2000 | Pelczynski | 73/861.66 |

OTHER PUBLICATIONS

Company advertisement sheet: pf&f LTD. Cage Cleaning Station (2 sheets).

* cited by examiner

Primary Examiner—Harold Joyce
Assistant Examiner—Derek S. Boles
(74) Attorney, Agent, or Firm—Kennedy Covington Lobdell & Hickman, LLP

(57) ABSTRACT

A housing of a fume hood includes walls defining a chamber for containment of air therein. One of the walls defines an air passageway opening into the chamber, and a sensor is located outside of the chamber and measures airflow velocity through the air passageway into the fume hood. An elongate, perforated tubular member supported within the chamber includes a first end mounted to the wall of the chamber defining the air passageway in surrounding relation thereto, and a second, distal end substantially closed off from the contaminated air within the chamber whereby airflow through the air passageway into the fume hood generally must pass through a perforation in the tubular member to gain access into the air chamber. The tubular member extends across the width of the chamber and airflow velocity through the air passage is representative of overall air entry velocity into the air chamber.

12 Claims, 3 Drawing Sheets

MONITORING AIR ENTRY VELOCITY INTO FUME HOOD

FIELD OF THE PRESENT INVENTION

The present invention relates to fume hoods and, in particular, to an apparatus and method for monitoring air entry velocity into an air chamber of the fume hood.

BACKGROUND OF THE PRESENT INVENTION

Fume hoods are well known in the art. Generally, each fume hood includes walls defining an air containment chamber and one or more sash doors through which materials within the air containment chamber are handled. A negative pressure source is connected with the air chamber for withdrawing air from the chamber that is contaminated with noxious or hazardous fumes given off by the materials kept within the chamber. To preclude the fumes from escaping through an open sash door, a sufficient source of negative pressure is maintained to create a sufficient airflow through the open sash door to sweep all of the fumes away toward the negative pressure source. Additionally, vents and the like are also provided for admitting air from outside of the chamber into the chamber for sweeping the fumes away toward the negative pressure source when the sash doors each are closed.

It is conventional practice to monitor the airflow through open sash doors, vents and the like (also referred to as "air entry velocity" or "face velocity") by measuring the velocity of airflow through a small air passageway provided in a wall of the fume hood defining the air chamber. Such monitoring safeguards against otherwise unnoticed ruptures or leaks in ductwork or a fume hood wall, and against exhaust fan failure. If undetected, any of these eventualities could reduce air entry velocity into the air chamber and permit contaminated air to escape from the fume hood.

The conventional airflow sensor is thermal in nature and typically is disposed outside of the fume hood air chamber and directly admits air into the air chamber through the small air passageway disposed in the fume hood wall. In this regard, the air passageway consists of a single entry orifice disposed in the air chamber wall and an air tube connects the sensor with the orifice in airtight communication.

Velocity through an airflow sensor is either equal to or proportional to air entry velocity into the air chamber. In normal operating conditions, acceptable air entry velocity is between 80–200 FMP. An alarm also is provided in conjunction with the sensor and is preset to go off in the event that the airflow velocity drops to 60–90 FMP, depending on the alarm setpoint, which is taken to indicate a rupture, leak or other problem with the fume hood.

The conventional location of the entry point of the airflow into the air chamber through the sensor is believed to be unsuitable to yield a representative monitoring point reflective of overall average air entry velocity into the air chamber. In particular, since the entry point of the air passageway is necessarily located on one side of the air chamber, an open sash door proximate the entry point will more greatly influence airflow through the sensor than would an open sash door of the same size on the opposite side of the air chamber. Consequently, the current monitoring technique is not as accurate and consistent as is otherwise desired; the sensor readings are primarily only representative of the local vicinity of the air passageway entry point within the air chamber, and not of the overall air entry velocity of the fume hood extending from side-to-side of the air chamber.

Accordingly, the present invention provides a fume hood in which a sensor more accurately monitors overall air entry velocity into the air chamber.

SUMMARY OF THE PRESENT INVENTION

Briefly described, the fume hood of the present invention includes a housing having walls defining a chamber for confinement of contaminated air therein. One of the walls defines an air passageway for airflow from outside of the chamber into the chamber, and a sensor is located outside of the chamber and is disposed in airtight communication with the air passageway for measuring airflow through the air passageway. In a feature of the present invention, a conduit extends between and connects the sensor in airtight communication with the air passageway.

In accordance with the present invention, an elongate, perforated tubular member is supported within the chamber and includes a first end disposed in surrounding relation to the air passageway. A second, distal end of the tubular member is substantially closed off from the air within the chamber. Accordingly, airflow through the air passageway generally must pass through one of many perforations in the tubular member to gain access into the air chamber.

In features of the present invention: the tubular member comprises a generally linear, horizontally extending rigid cylindrical tube; the tubular member extends across an entire width of the chamber and is mounted in orthogonal relation to opposed walls of the housing defining the chamber; and the perforations are generally aligned in a single row along the tubular member with each perforation generally facing in the same radial direction.

The present invention also includes the method of monitoring air entry velocity into an air chamber of a fume hood, including the steps of: covering an air passageway in a wall defining the air chamber of the fume hood with a perforated tubular member such that airflow from outside of the fume hood through an air passageway generally must pass through a perforation in the tubular member to gain access into the air chamber; and thereafter measuring airflow velocity through the air passageway.

BRIEF DESCRIPTION OF THE DRAWINGS

A preferred embodiment of the fume hood of the present invention will now be described in detail with reference to the accompanying drawings, wherein.

DETAILED DESCRIPTION OF THE PREFERRED EMBODIMENT

With reference to the drawings, a preferred embodiment of the fume hood of the present invention will now be described in detail.

Figure 1:
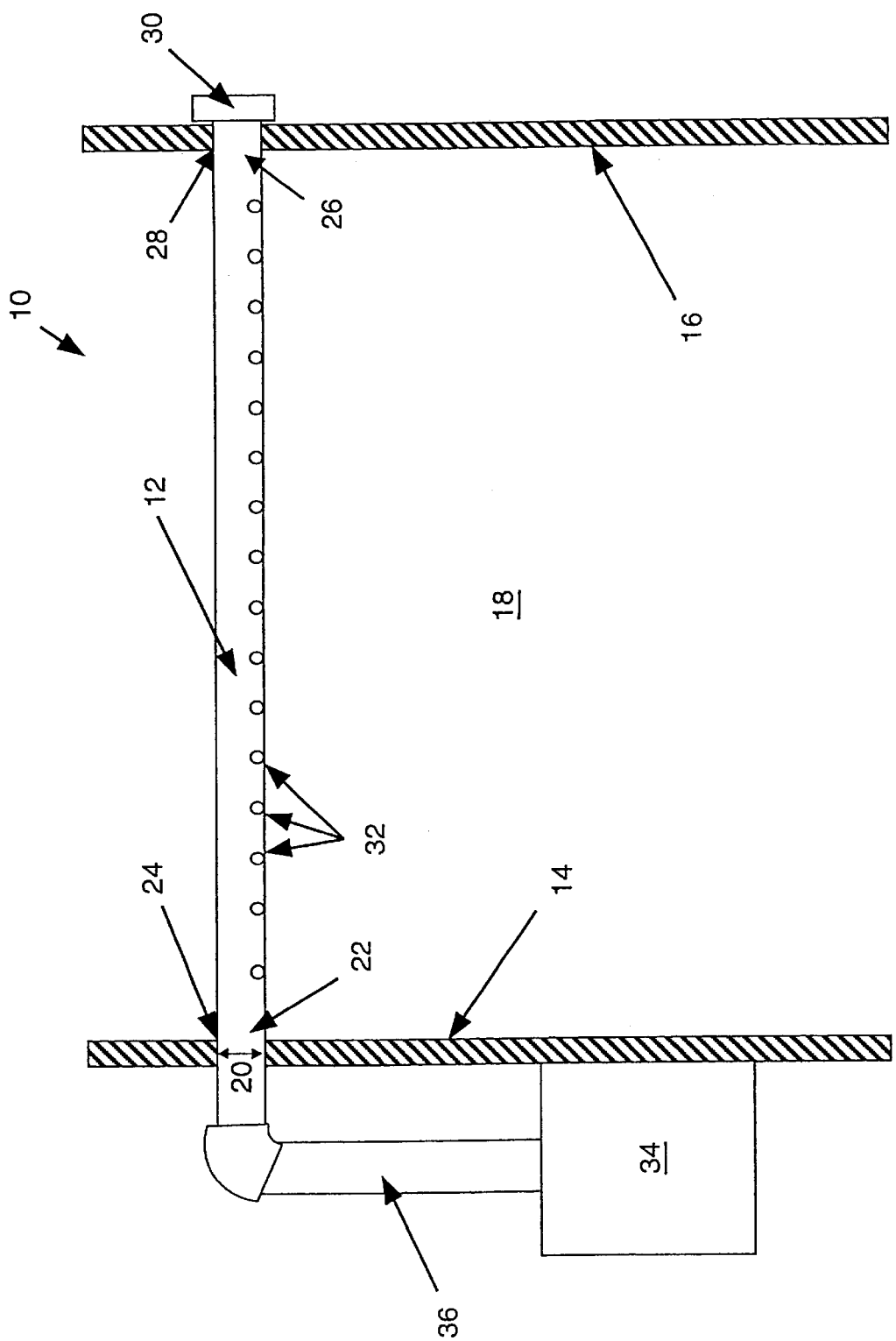
FIG. 1 is a diagrammatic elevational view in partial cross-section of a preferred fume hood in accordance with the present invention.

Shown diagrammatically in FIG. 1, the preferred fume hood 10 of the present invention includes a perforated tubular member 12 linearly extending horizontally between opposed walls 14,16 of an air chamber 18 of the fume hood. The tubular member 12 is preferably formed from PVC piping. A first wall 14 defines an air passageway 20 opening into the air chamber 18, and a first end 22 of the tubular member 12 is mounted to the wall 14 in surrounding relation to the air passageway 20 to enclose the air passageway 20 at 24. Specifically, in the preferred fume hood 10, the tubular member 12 extends through the wall 14 in abutment therewith for enclosure of the air passageway 20. The tubular member 12 also extends across the entire width of the chamber 18 and, in like manner, a second, distal end 26 of the tubular member 12 extends at 28 through and is thereby mounted to the wall 16 for additional support of the tubular member 12, the second end 26 being closed off in airtight manner by end cap 30.

Additionally, the tubular member 12 is cylindrical and rigid, and extends in orthogonal relation to the opposed walls 14,16. The tubular member 12 also includes perforations 32 (as used herein, the "perforations" of the "perforated tubular member" means air openings, or holes, through which air passes and is generic to any particular shape of the opening). In the preferred embodiment, all of the perforations 32 formed in the tubular member 12 are generally aligned in a single row extending along the length of the tubular member 12 between the opposed ends 22,26 thereof. The perforations 32 also face in the same radial direction relative to an axis of the tubular member 12.

The preferred fume hood 10 includes a conventional sensor 34 located outside of the air chamber 18. The sensor 34 is connected in airtight communication with the end 22 of the tubular member 12, and hence with the air passageway 20 defined by the wall 14, through a tubular conduit 36. An alarm is also associated with the sensor 34.

Figure 2:
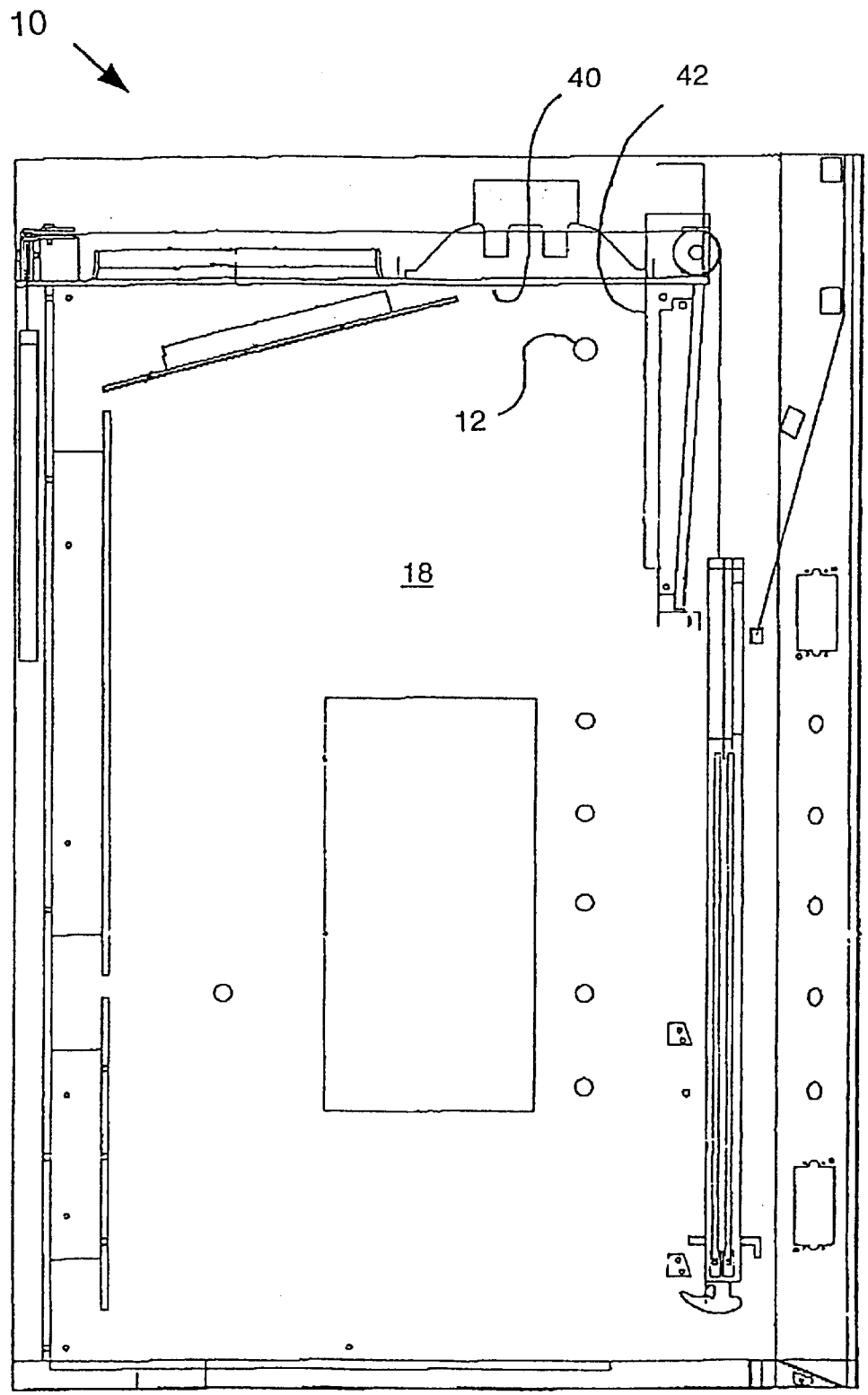
FIG. 2 is an elevational view in cross-section of a side of the preferred fume hood of FIG. 1.

The actual preferred fume hood 10, shown diagrammatically in FIG. 1, is also shown in cross-section in FIG. 2. The perforated tube 12 of with the present invention is mounted within the air chamber 18 in an upper front portion of the air chamber and extends the entire width thereof. Specifically, the perforated tube is preferably located six inches from the top 40 of the air chamber 18, and six inches from the front wall 42 of the air chamber 18. Additionally, the perforated tube includes a diameter of 0.608 inches. The perforations are uniform and each comprises ⅛ inch diameter circular holes and are serially, uniformly spaced along the length of the tubular member. The ratio of the cross-sectional area of the tubular member to the area of the sum of all perforations preferably is approximately 1.6. Furthermore, no perforations are provided in the tubular member within 1 inch of the walls 14,16 of the air chamber 18 in order to avoid localized turbulence along the walls 14,16 from greatly affecting the airflow within the tubular member 12.

It should be appreciated that the features of the fume hood 10 shown in FIG. 2 but not included in the diagranmmatic illustration of FIG. 1 mostly relate to the generation of predefined flow patterns within the air chamber 18, form no part of the present invention, and are fully described in detail in copending U.S. patent application Ser. No. 09/727,614, of Robert Haugen, titled Fume Hood with Air Control System and filed on Dec. 1, 2000, which application is assigned to the assignee of the present application, the entire disclosure of which is hereby incorporated by reference.

Having now described in detail the preferred structure of the fume hood of the present invention, it will be apparent that the air passageway 20 in the wall 14 of the air chamber 18 is covered by the perforated tubular member 12 such that airflow through the air passageway 20 into the fume hood generally must pass through a perforation 32 in the tubular member 12 to gain access into the air chamber 18. As a result of the elongate, perforated tubular member 12, the airflow velocity through the air passageway 20 as measured by the sensor 34 is representative of the airflow velocity prevailing at each of the perforations 32 extending along the length of the perforated tubular member 12 between the opposed walls 14,16 of the air chamber 18. Accordingly, measured airflow velocity through the air passageway 20 is a more consistent and accurate measurement representative of the overall air entry velocity of the fume hood as compared to a more localized air entry velocity prevailing simply in the vicinity of the air passageway.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Thus, while the present invention has been described herein in detail in relation to one or more preferred embodiments, this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 3:
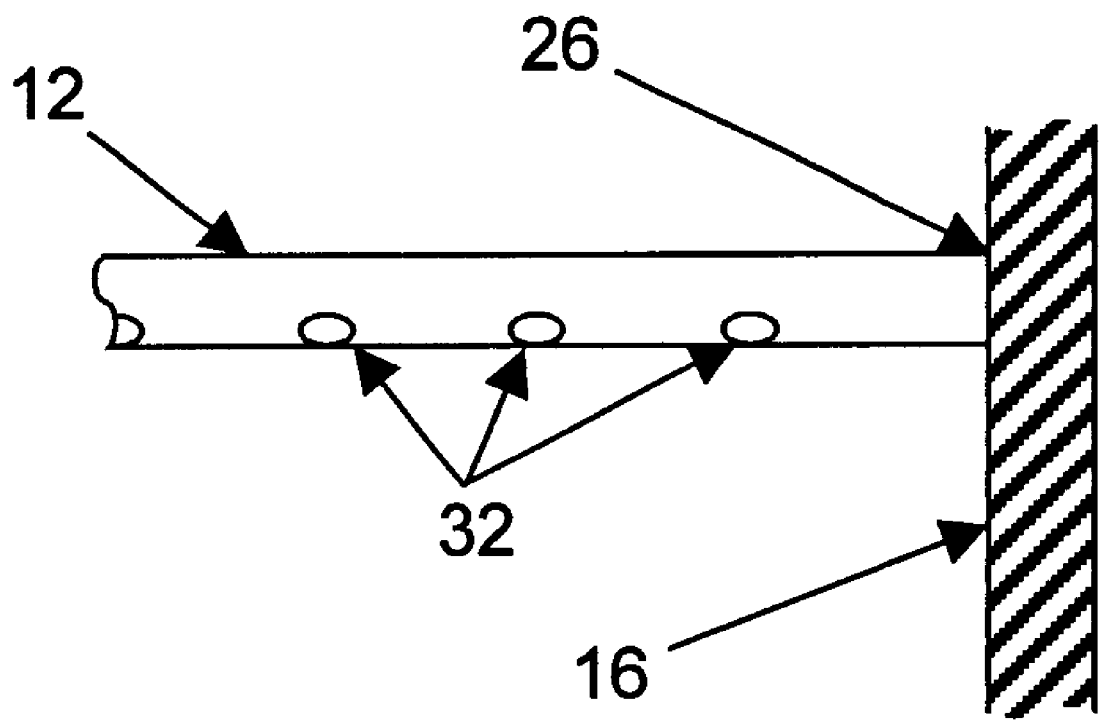
FIG. 3 is a detail view showing an alternative embodiment of the present invention.

For instance, rather than the tubular member extending through each of the opposed walls, the ends of the tubular member could equivalently be affixed to the facing surfaces of the opposed walls in airtight manner, such as by sealing the end 26 of the perforated tubular member 12 flush with the wall 16, as illustrated in FIG. 3. In this modification, the end cap would not be necessary, as the opposed wall functions to close off and seal the second end of the tubular member.

What is claimed is:

1. A fume hood, comprising:

a housing defining an air chamber and including a first wall defining an air passageway therein for airflow from outside of said chamber into said chamber, a closed-end, perforated tubular member mounted within said chamber to said first wall in surrounding relation to and in airtight communication with said air passageway such that airflow through said air passageway generally must pass through a perforation in said tubular member, said closed-end of said tubular member comprising a second, distal end closed by a second wall of said housing; and a sensor connected in airtight communication with said air passageway for measuring airflow velocity through said air passageway.

2. The fume hood of claim 1, wherein said tubular member is mounted to said housing at opposed walls of said chamber.

3. The fume hood of claim 1, wherein said tubular member extends across an entire width of said chamber.

4. The fume hood of claim 1, wherein said perforations are spaced at least one inch along said tubular member from said housing defining said chamber.

5. The fume hood of claim 1, wherein said perforations are circular and each includes a radius of approximately 0.0625 inches, said tubular member includes a diameter of approximately 0.608 inches, and said perforations are spaced approximately two inches apart from each other along said tubular member.

6. The fume hood of claim 1, wherein said perforations defined by said tubular member are aligned in a single row along a length of said tubular member.

7. The fume hood of claim 1, wherein said perforations each generally face in the same radial direction.

8. The fume hood of claim 1, wherein said sensor is located outside of said chamber.

9. The fume hood of claim 1, wherein said tubular member is rigid and cylindrical.

10. The fume hood of claim 1, wherein said tubular member is straight and extends horizontally.

11. The fume hood of claim 1, wherein a wall of said housing defines said air passageway and said tubular member is generally orthogonal to said wall.

12. The fume hood of claim 1, wherein said second wall faces said first wall defining said air passageway and is disposed on an opposite side of said chamber.

* * * * *